United States Patent [19]

Kawaguchi et al.

[11] 4,441,380
[45] Apr. 10, 1984

[54] FOOT-OPERATED CONTROL DEVICE FOR PARKING BRAKE

[75] Inventors: Hiroshi Kawaguchi, Mishima; Shuho Nishina, Susono, both of Japan

[73] Assignee: Toyota Jidosha Kabushiki Kaisha, Toyota, Japan

[21] Appl. No.: 440,600

[22] Filed: Nov. 10, 1982

[30] Foreign Application Priority Data

Nov. 11, 1981 [JP] Japan .......................... 56-167925[U]
Nov. 19, 1981 [JP] Japan .......................... 56-172437[U]
Nov. 19, 1981 [JP] Japan .......................... 56-172438[U]

[51] Int. Cl.³ ............................................. G05G 1/14
[52] U.S. Cl. ..................................... 74/512; 74/529; 74/539; 74/540
[58] Field of Search ............... 74/542, 529, 539, 512, 74/, 540, 534, 527, 526; 267/155, 154

[56] References Cited

U.S. PATENT DOCUMENTS

| 2,835,140 | 5/1958 | Cox ......................... 74/542 |
| 2,938,406 | 5/1960 | Rhodes ..................... 74/539 |
| 2,940,334 | 6/1960 | Koskela .................... 74/539 |
| 2,995,047 | 8/1961 | Hinsey ..................... 74/540 |
| 3,003,365 | 10/1961 | McKenrie .................. 74/542 |
| 3,400,607 | 9/1968 | Smith ...................... 74/512 |
| 4,036,078 | 7/1977 | Muehuling .................. 74/539 |
| 4,218,936 | 8/1980 | Waggoner ................... 74/529 |
| 4,364,284 | 12/1982 | Tani et al. ................ 74/540 |

FOREIGN PATENT DOCUMENTS

55-146363 10/1980 Japan .

Primary Examiner—Leslie A. Braun
Assistant Examiner—Anthony W. Raskob, Jr.
Attorney, Agent, or Firm—Kenyon & Kenyon

[57] ABSTRACT

A foot-operated device for controlling a parking brake wherein a parking brake pedal is locked in its operated position through engagement of a pawl member with ratchet teeth. The pawl member is connected to a bracket pivotally supporting the pedal, and the ratchet teeth are formed on the pedal. The parking brake is released only when a pedal pad pivotally connected to the pedal is pivoted on the pedal and the pedal is depressed. Near the pawl member is disposed a lever pivotally connected to the bracket. The pedal, pedal pad, pawl member and lever are pivoted about respective axes which are parallel to one another. The pedal pad and the lever are connected by a connecting device which transmit a pivotal movement of the pedal pad to the lever such that a movement of said pedal pad incident to a pivotal movement of the pedal is not transferred to the lever. The parking brake control device further comprises a spring device for biasing the pawl member in a first direction that causes the pawl member to engage the ratchet teeth while the pedal pad is in its original position, and biasing the pawl member in a second direction that causes the pawl member to disengage from the ratchet teeth while the pedal pad is in its operated position. The force with which the pawl member is biased in the second direction is selected to be smaller than an engagement force existing between the pawl member and the ratchet teeth in engagement with the pawl member.

14 Claims, 11 Drawing Figures

FOOT-OPERATED CONTROL DEVICE FOR PARKING BRAKE

BACKGROUND OF THE INVENTION

The present invention generally relates to a foot-operated control device for a parking brake of a vehicle, and more particularly to a control device which is manipulated solely by foot by the vehicle operator to release the parking brake being applied to the vehicle.

Most control devices known in the art for a parking brake are of the type which is manipulated by hand to release the parking brake which has been placed in its operated position. This type of control device has some recognized drawbacks: that it is difficult to release the brake because the operator has to lean forward; that it is hard to start the vehicle on a slope because the brake is released abruptly; and that the parking brake pedal generates sounds of impact when its return movement for releasing the brake is blocked by a stop at the original position. Although these drawbacks may be overcome if the manipulation of the control device for releasing the brake is conducted not by hand but only by foot, this type of brake releasing arrangement suffers a different drawback that the parking brake pedal may possibly be operated by foot of the operator inadvertently or carelessly with a result of releasing the brake unintentionally while the operator is boarding or leaving the vehicle. Thus, the foot-operated control device has been required to obviate the above drawback.

Known as a solution to the above problem, is a device disclosed in JITSU-KAI-SHO 55-146363, publication of Japanese Utility Model application for public inspection, wherein a parking brake held in its operated position is released only when both pivotal movement and depressing action of a pedal pad pivotally connected to the end of a parking brake pedal are carried out. The parking brake release mechanism as shown in the above publication is applicable only to control devices of the type in which the parking brake pedal is locked in its operated position by a pawl member pivotally connected to the pedal such that the pawl member engages ratchet teeth of a bracket which pivotally supports the pedal. However, there are control devices of different type wherein the pawl member is pivotally supported on the bracket and the mating ratchet teeth are formed on the parking brake pedal. These control devices are also required to be manipulated solely by foot without use of hands and have means for preventing an unintentional release of the brake due to inadvertent contact of the vehicle operator with the parking brake pedal. For satisfying such requirement, however, it is impossible to use the arrangement of the mechanism disclosed in the said publication. In the latter type of control devices, a pedal pad designed as a brake releasing member is disposed on the parking brake pedal while the pawl member which is disengaged by the action of the pedal pad is connected to the bracket by which is pivotally supported the parking brake pedal. This construction does not apply to the mechanism of the disclosure in the above publication wherein the pedal pad and the pawl member are both connected to the parking brake pedal.

SUMMARY OF THE INVENTION

The present invention was made in view of the above background. It is accordingly an object of the invention to provide a foot-operated control device for a parking brake, wherein the parking brake pedal is locked in its operated position through engagement of a pawl member connected to the bracket with ratchet teeth formed on the pedal, which control device permits the parking brake to be released only when the pivoting and depressing actions of the pedal pad are both conducted.

Another object of the invention is to provide such parking brake control device having a minimum number of parts and available at reduced cost of manufacture.

To attain the above objects, a control device according to the present invention comprises:

a bracket;

a parking brake pedal connected to the bracket pivotally about a first axis and having at one end thereof ratchet teeth formed along an arc of a circle a center thereof being located at the first axis;

a pedal pad connected to the other end of the parking brake pedal pivotally about a second axis parallel to the first axis, the pedal pad being pivoted between its original position and operated position;

a pawl member connected to the bracket pivotally about a third axis parallel to the first axis, the pawl including a pawl engageable with the ratchet teeth;

a lever connected to the bracket pivotally in proximity of the pawl member about a fourth axis parallel to the first axis;

connecting means for linking the pedal pad to the lever to transmit a pivotal movement of the former to the latter such that a movement of the pedal pad incident to a pivotal movement of the parking brake pedal is not transferred to the lever; and spring means, associated with the pawl member and the lever, for biasing the pawl member in a first direction that causes the pawl to engage the ratchet teeth while the pedal pad is placed in the original position, and biasing the pawl member in a second direction that causes the pawl to disengage from the ratchet teeth while the pedal pad is placed in the operated position, the direction of biasing the pawl member by the spring means being changed from the first direction to the second direction by a pivotal movement of the lever resulting from the pivotal movement of the pedal pad from the original position to the operated position, a biasing force of the spring means in the second direction being smaller than an engagement force existing between the pawl member and the ratchet teeth in engagement with the pawl member.

In the control device constructed as described above, the direction in which the pawl member is biased by the spring means is changed, when the lever is pivoted to its operated position by a pivotal movement of the pedal pad from its original to its operated position while the pedal is in the operated position, from the direction (first direction) that causes the pawl member to engage the ratchet teeth to the direction (second direction) that causes the former to disengage from the latter. Even when the biasing direction is changed to the second direction, however, the pawl member will not disengage from the ratchet teeth. For the pawl member to be able to disengage, the engaging force existing between the mutually engaging pawl member and ratchet teeth must be removed, viz., the parking brake pedal must be further-pivoted a slight angle from the operated position by applying a depression onto the pedal pad simultaneously with, or prior or subsequent to, the pivotal movement of the pedal pad to its operated position. This prevents an unintentional release of the brake due to inadvertent contact of the operator with the pedal or pedal pad. Another feature of the above control device resides in the arrangement wherein the connecting means will not transmit to the lever a movement of the pedal pad incident to the pivotal movement of the parking brake pedal. This will prevent a change in the position of the lever due to the pivotal movement of the pedal.

According to one preferred form of the invention, the control device comprises:

- a bracket fixed to a frame of the vehicle;
- a parking brake pedal connected to the bracket pivotally about a first axis and having at one end thereof ratchet teeth formed along an arc of a circle having a center located at the first axis;
- a pedal pad connected to the other end of the parking brake pedal pivotally about a second axis parallel to the first axis, the pedal pad being pivoted between its original position and operated position;
- a first lever having an axially middle portion connected to an axially middle portion of the parking brake pedal pivotally about a third axis parallel to the first axis, and one end engaging the pedal pad, the first lever being pivoted in one direction when the pedal pad is pivoted in the opposite direction from the original position to the operated position;
- a second lever connected to the bracket pivotally about a fourth axis parallel to the first axis, and having a first arm portion engaging the other end of the first lever in the proximity of the first axis, the second lever being pivoted in the opposite direction when the first lever is pivoted in the one direction;
- a pawl member connected to the bracket pivotally about a fifth axis parallel to the first axis, and having a pawl engageable with the ratchet teeth of the parking brake pedal; and
- spring means, associated with the second lever and the pawl member, for biasing the pawl member in a first direction that causes the pawl to engage the ratchet teeth while the pedal pad is placed in the original position, and biasing the pawl member in a second direction that causes the pawl to disengage from the ratchet teeth while the pedal pad is placed in the operated position, the direction of biasing the pawl member by the spring means being changed from the first direction to the second direction by a pivotal movement of the second lever resulting from a pivotal movement of the pedal pad from the original position to the operated position, a biasing force of the spring means in the second direction being smaller than an engagement force existing between the pawl member and the ratchet teeth in engagement with the pawl member.

In the above preferred embodiment of the control device, the direction of biasing the pawl member is changed from the first to the second direction when the second lever is pivoted to its operated position by the pivotal movement of the first lever which is caused by the pivotal movement of the pedal pad while the pedal is in the operated position. Further, the engagement of the first lever supported on the pedal, with the second lever supported on the bracket, take places in the proximity of the axis of pivoting of the pedal. Thus, the pivotal movement of the pedal relative to the bracket will not cause the first and/or second levers to be pivoted.

In a control device of the invention constructed in another preferred form, the pawl member includes an arm extending in a direction substantially opposite to a direction in which the pawl extends, and the second lever includes a second arm portion extending substantially in parallel to the arm of the pawl member. The spring means comprises a first spring biasing the pawl member in the first direction and a second spring biasing the pawl member in the second direction, a resilient force of the first spring being greater than that of the second spring which is smaller than the engaging force between the pawl member and the ratchet teeth. The second arm portion of the second lever has a projection engaging the arm of the pawl member while the pedal pad is in the original position. The projection disengages from the arm of the pawl member when the pivotal movement of the second lever takes place.

In the modified form of the control device constructed as described above, the pivotal movement of the pedal pad to its operated position while the pedal is in the operated position will cause the first and second levers to pivot to their operated position whereby the second lever disengages from the pawl member. As a result, the biasing force of the first spring which has been applied to the pawl member through the second lever, is cut off, and thus the pawl member is biased only by the second spring in the direction that causes the disengagement thereof from the ratchet teeth.

According to a further modified form of the invention, the control device comprises:

- a bracket fixed to a frame of the vehicle;
- a parking brake pedal connected to the bracket pivotally about a first axis and having at one end thereof ratchet teeth formed along an arc of a circle having a center located at the first axis;
- a pedal pad connected to the other end of the parking brake pedal pivotally about a second axis parallel to the first axis, the pedal pad being pivoted between its original position and operated position;
- a pawl member connected to the bracket pivotally about a third axis parallel to the first axis, the pawl member including a pawl engageable with the ratchet teeth;
- a lever connected to the bracket pivotally in proximity of the pawl member about a fourth axis parallel to the third axis;
- an extension arm extending from the rear surface of the pedal pad;
- a wire connecting the extension arm and the lever such that the lever is in its original position when the pedal pad is in the original position and such that the lever is pivoted to its operated position when the pedal pad is pivoted to the operated position;
- a wire guide supporting and guiding a substantially middle portion of the wire at the position of the first axis;
- a first spring biasing the pawl member in a first direction that causes the pawl to engage the ratchet teeth while the lever is in the original position; and
- a second spring biasing the pawl member in a second direction that causes the pawl to disengage from the ratchet teeth while the lever is in the operated position, a resilient force of the second spring being smaller than an engagement force existing between the pawl member and the ratchet teeth in engagement with the pawl member.

In the control device constructed as described above, the pivotal movement of the pedal pad to its operated position while the pedal is in the operated position will cause the lever to pivot to its operated position via the connecting wire whereby the pawl member is biased by the second spring in the direction that causes the disengagement thereof from the ratchet teeth. In addition, the arrangement of the wire guide such that the wire connecting the pedal pad and the lever is guided and supported at the position of the axis of pivoting of the pedal, will prevent a change in length of the wire necessary to connect the pedal pad and the lever even when the pedal is pivoted relative to the bracket whereby the position of the lever is not changed by the pivotal movement of the pedal.

BRIEF DESCRIPTION OF THE DRAWINGS

The above and other objects, features and advantages of the present invention will become more apparent from reading the following description of the preferred emobodiments taken in connection with the accompanying drawings in which.

DETAILED DESCRIPTION OF THE PREFERRED EMBODIMENTS

The present invention will be described in detail with reference to the accompanying drawings which illustrate different forms of a control device constructed according to the invention.

Figures 1, 2:
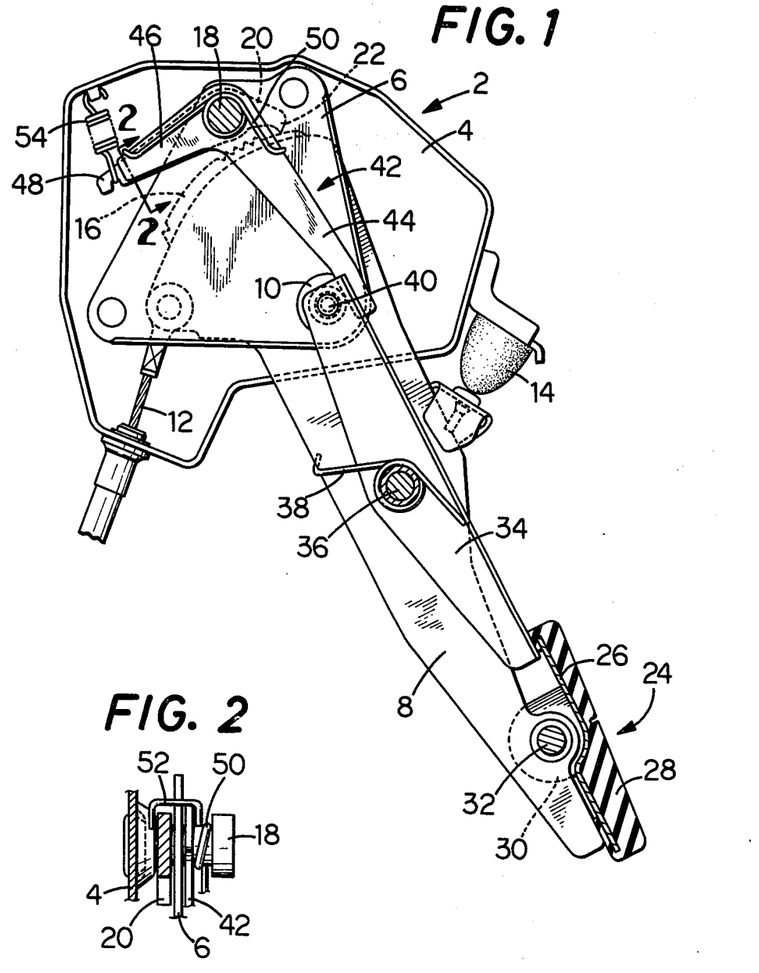
FIG. 1 is a side elevation, partly in cross section, of an embodiment of a foot-operated control device for a parking brake of the invention.
FIG. 2 is a cross section taken along line 2—2 of FIG. 1.

Referring first to FIG. 1, there is shown a bracket 2 consisting of a first member 4 and a second member 6 which are fixed to and spaced from each other. Between the first and second members 4 and 6, is connected a fulcrum shaft 10 to which is pivotally connected a parking brake pedal 8. This pedal 8 has a comparatively long lower arm downwardly extending from the shaft 10, and a comparatively short upper arm upwardly extending therefrom. The short upper arm is connected, at a portion thereof remote from the shaft 10, to a parking brake cable 12. In this condition, the pedal 8 is normally biased with a tensile force of the cable 12 or a force of a return spring (not shown) such that the same pedal 8 is caused to pivot counterclockwise as seen in FIG. 1 until a stop 14 fixed to the bracket 2 arrests the lower arm at a predetermined position in its pivotal movement. This position is referred to as "non-operated position" of the pedal 8 or the control device.

The short upper arm of the pedal 8 is formed with a ratchet end 16 having a multiplicity of teeth along an arc of a circle whose center is located at the pivoting axis of the pedal 8, i.e., the fulcrum shaft 10. The ratchet end 16 at the free end of the short upper arm is engageable with the free end of a pawl 22 of a pawl member 20 which is pivotal about a pin 18 which is disposed in parallel to the fulcrum shaft 10 of the pedal 8. On the other hand, the free end portion of the long lower arm of the pedal 8, viz., the lower end portion of the pedal 8 is provided with a pedal pad 24 at which the pedal 8 is depressed to cause it to pivot clockwise about the shaft 10 and pull the parking brake cable 12. The pedal 8 thus operated is held at a pivoted position by means of engagement of the pawl member 20 with the ratchet end 16. This pivoted position is referred to as "operated position" of the pedal 8 or the control device.

The pedal pad 24 comprises a base plate 26 of steel sheet, a rubber member 28 of substantially rectangular shape secured to one surface of the base plate 26, and a pair of leg portions 30 extending from a middle part of the other surface of the base plate 26. The pair of leg portions 30 are pivotally connected to the pedal 8 with a pin 32 which is parallel to the fulcrum shaft 10. The long lower arm of the pedal 8 has another pin 36 at an axially middle portion thereof, which pin 36 is fixed in parallel to the shaft 10 and pivotally supports a lever 34 at its axially middle portion. The lever 34 is biased by a torsion spring 38 wound about the pin 36 such that it is pivoted counterclockwise as seen in FIG. 1, and one end of the lever 34 engages an end part of said other surface, i.e., rear surface of the base plate 26, whereby the pedal pad 24 is biased by the lever 34 so as to pivot clockwise. The pad 24 has, at the other end part of the rear surface, a portion which abuts onto the extreme lower end of the pedal 8 to prevent the pad 24 from pivoting clockwise about the pin 32 beyond a predetermined limit, whereby the pivotal movements of the lever 34 and the pad 24 are limited to a position shown in FIG. 1. This position is referred to as "original position" of the lever 34 and pad 24. The other end of the lever 34 which is opposite to the end engaging the pad 24, has a pin 40 fixed thereto so as to be aligned or concentric with the fulcrum shaft 10 when the lever 34 is placed in its original position.

To the pin 18 pivotally connecting the pawl member 20 to the bracket 2, there is pivotally connected a bell-crank lever 42 which has an arm extending toward the lever 34 so that it is engageable therewith through contact of its end with the pin 40 fixed to the lever 34. The bell-crank lever 42 has a further arm 46 which extends substantially in parallel to an arm 48 of the pawl member 20 extending in a direction almost opposite to the direction of extension of the pawl 22 engageable with the ratchet end 16. To the pin 18 is fixed a torsion spring 50 both arms of which have respective end portions engaging the arms 44 and 46 of the lever 42. As clearly seen in FIG. 2, one of the end portions is folded to form a right-angled bent portion 52 which is engageable with the arm 48 of the pawl member 20 as well as the arm 46 of the lever 42. When the pedal pad 24 and the lever 34 are held in their original position illustrated in FIG. 1, however, the side of the arm 46 which is kept in contact with the bent portion 52 is positioned slightly away from the corresponding side of the arm 48 in the upward direction as viewed in FIG. 2, and consequently the bent portion 52 of the torsion spring 50 is kept in slightly spaced relation with the arm 48 of the pawl member 20. The free end of the arm 48 is connected to the bracket with a coil spring 54 which normally urges the pawl member 20 in a direction that will cause the arm 22 to engage the ratchet end 16. The resilient force of the coil spring 54 is selected to be smaller than that of the torsion spring 50.

When a parking brake is applied through the control device constructed as described above, the parking brake pedal 8 is pivoted clockwise by applying depression onto the lower half of the pedal pad 24 while it is in the original position shown in FIG. 1. As a result, the cable 12 is pulled and the parking brake connected to the cable 12 is actuated. The pedal 8, and accordingly the parking brake, are held in the operated position by the pawl member 20 which is kept in engagement with the ratchet end 16 by the resilient force of the coil spring 54.

Figures 3, 4:
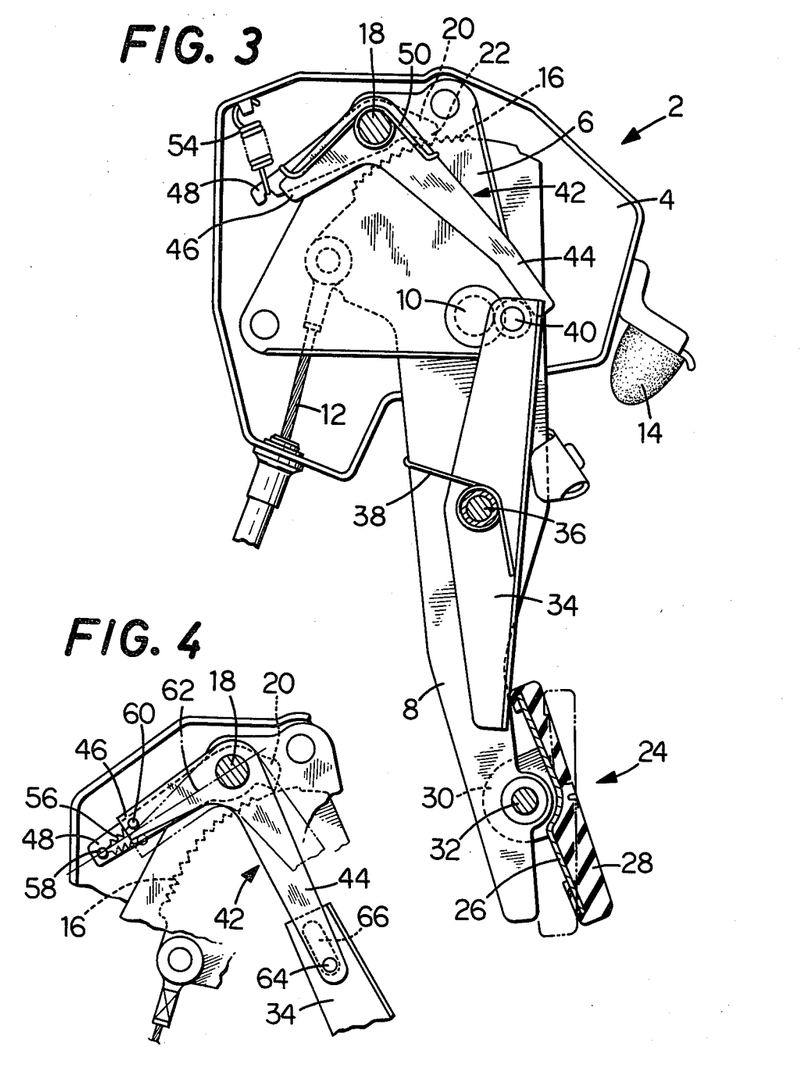
FIG. 3 is a side elevation of the control device of FIG. 1 when placed in its operated position.
FIG. 4 is a side elevation showing an essential part of another embodiment of the control device of the invention.

When the applied parking brake is released, on the other hand, the pedal pad 24 is pivoted counterclockwise to its operated position, as shown in FIG. 3, by applying depression onto the upper half of the pedal pad 24. The counterclockwise rotation of the pad 24 will cause a clockwise pivotal movement of the lever 34 about the pin 36, which in turn results in a counterclockwise pivotal movement of the bell-crank lever 42 which engages the pin 40 of the lever 34. When the lever 42 is pivoted counterclockwise about the pin 18, the arm of the torsion spring 50 engaging the arm 46 of the lever 42 comes into engagement with the arm 48 of the pawl member 20, whereby the pawl member 20 which has been biased by the coil spring 54 is then urged by the torsion spring 50 with a force equal to a balance between the resilient forces of the two springs in a direction that will cause the pawl 22 to be separated from the ratchet end 16 of the pedal 8. In this condition, however, the pawl 22 of the pawl member 20 will not disengage from the ratchet end 16 as the balance in resilient force between the two springs 50 and 54 is so selected as to be smaller than an engagement force existing between the pawl 22 and the ratchet end 16, that is, smaller than a force preventing the pawl 22 from separating from the ratchet end 16 as with friction therebetween. When the pad 24 is given a further depression and the pedal 8 pivoted clockwise a further angle from the above position, the engagement force between the pawl 20 and the ratchet end 16 is lost thereby allowing the pawl member 20 to be separated from the ratchet end 16.

Therefore, a gradual withdrawal of the pedal 8 with the pad 24 kept in its operated position will provide for a slow release of the parking brake and thus permit an easy start of a vehicle which has parked on a slope. Unlike a control device wherein a parking brake is released by hand, the control device of the invention will not generate an undesired sound of impact of the pedal 8 with its stop because the pedal is not abruptly returned to the non-operated position. Further, if the vehicle operator contacted the pad 24 inadvertently and the pad was pivoted from the original position to the operated position, the pawl member 20 would not be separated from the ratchet end 16 unless the pedal 8 was further depressed from the operated position. Conversely, even if the pad 24 was depressed, the pawl member 20 will not disengage from the ratchet end 16 unless the depression of the pad 24 is accompanied with a pivotal movement thereof. Thus, an inadvertent contact of the operator with the pad 24 during boarding or leaving the vehicle will not lead to an unintentional release of the parking brake.

While, in the above description of the operation of the device, the pivotal movement of the pedal pad 24 precedes the depression of the same for easy understanding, it is apparent that the pivotal movement of the pad 24 and the depression of the pedal 8 may take place simultaneously, or the pivotal movement of the pad 24 may be preceded by the depression of the pedal 8, in order for the pawl member 20 to be able to disengage from the ratchet end 16. The requirement for releasing the parking brake is that the pivotal movement of the pad 24 and the depression of the pedal 8 (pad 24) be both performed.

Referring next to FIG. 4, there is illustrated another embodiment of the control device of the invention wherein a single coil spring 56 is used, to replace and serve the same function as the two springs or urging members used in the previous embodiment, i.e., coil spring 54 for biasing the pawl member 20 so as to keep the pawl 22 in engagement with the ratchet end 16, and torsion spring 50 for biasing the pawl member 20 so as to disengage the pawl 22 from the ratchet end 16. More specifically stated, a coil spring 56 is connected between a pin 58 fixed to the end of the arm 48 of the pawl member 20 and a pin 60 fixed to the end of the arm 46 of the lever 42. When the lever 42 is in the original position indicated in solid line, the pin 60 is located above a straight line 62 passing the pin 58 and the pin 18, whereby the pawl member 20 is urged by the spring 56 so as to engage the ratchet end 16. When the lever 42 is turned to its operated position indicated in broken line, the pin 60 is shifted to a position below the straight line 62, whereby the pawl member 20 is urged by the spring 56 so as to disengage from the ratchet end 16. Another structural difference of this embodiment from the previous embodiment resides in the manner of engagement of the arm 44 of the lever 42 with the lever 34, wherein they are connected with a pin 64 and an elongated hole 66. The structural features and advantages of other parts of this second embodiment are identical to those of the first embodiment of FIGS. 1–3.

Further modified forms of the control device of this invention are illustrated in FIGS. 5 through 11 wherein like reference characters used in the preceding figures designate like or corresponding parts throughout. Thus, the structural and operational descriptions of those parts are omitted.

Figure 5:
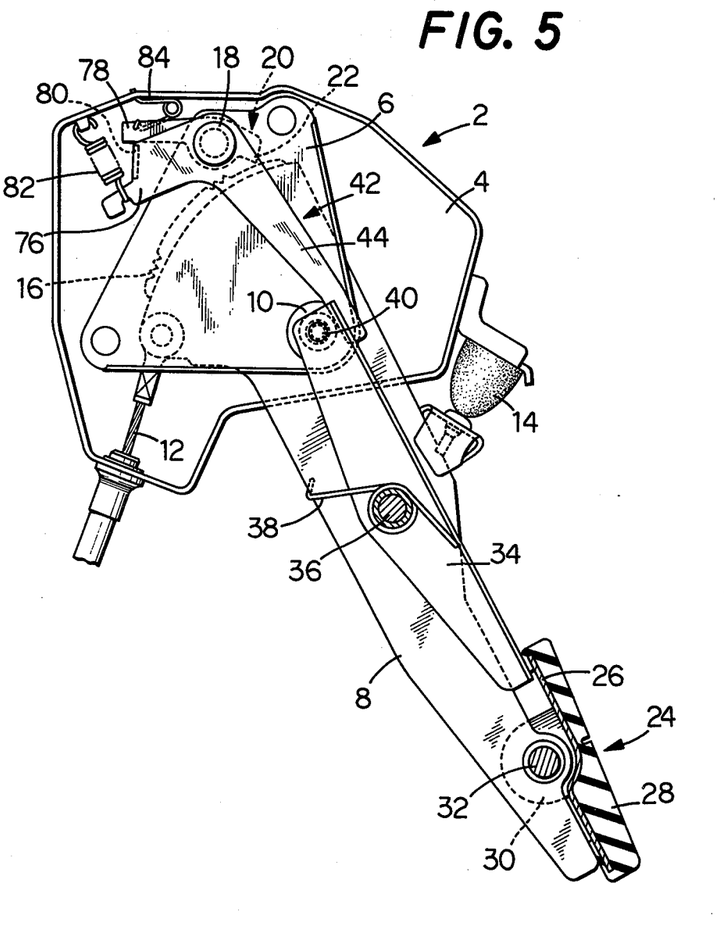
FIGS. 5 and 6 are side elevations, partly in cross section, of a further embodiment of the control device in its non-operated and operated positions, respectively.
Figure 6:
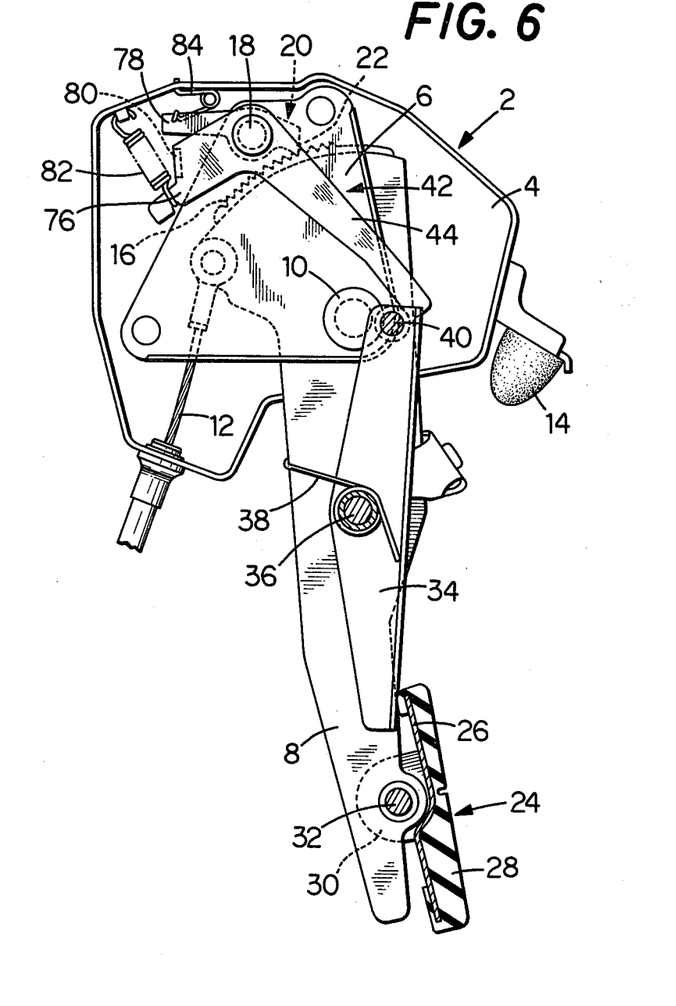

Referring to FIGS. 5 and 6 there is presented a third embodiment of the present control device wherein the pawl member 20 has an arm 78 extending in a direction opposite to the direction of extension of the previously indicated pawl 22, and the lever 42 has an arm 76 which extends substantially in parallel to the arm 78 of the pawl member 20. The lever 42 further has a projection or bent portion 80 extending to a position below the arm 78 from a middle part thereof. A coil spring 82 is connected between the free end of the arm 76 and the bracket 2 so that the lever 42 is biased clockwise as viewed in FIG. 5, whereby the bent portion 80 is held in engagement with the lower side surface of the arm 78 while urging the pawl member 20 in a direction that will cause the pawl 22 to engage the ratchet end 16.

Between the arm 78 of the pawl member 20 and the bracket 2 there is connected a torsion spring 84 which urges the pawl member 20 in a direction that will cause the pawl 22 thereof to be separated from the ratchet end 16. The resiliency of this torsion spring 84 is selected to be smaller than that of the coil spring 82, and also smaller than an engaging force existing between the pawl 22 and the ratchet end 16.

A pivotal movement of the lever 42 in the counterclockwise direction from its original position of FIG. 5 to its operated position of FIG. 6 will cause the bent portion 80 of its arm 76 to move away from the arm 78 of the pawl member 20 thereby removing the urging force of the coil spring 82 which has been applied to the pawl member 20 so as to keep the pawl 22 in engagement with the ratchet end 16. As a result, the pawl member 20 is now urged by the torsion spring 84 alone in the direction to separate the pawl 22 from the ratchet end 16. But the torsion spring 84 will not move the pawl member 20 off the ratchet end 16 because its resilient force is smaller than, and consequently unable to overcome, the engagement force between the pawl 22 and the ratchet end 16 as previously stated. In this condition, the engagement force is eliminated and the pawl member 20 in this position is allowed to disengage from the ratchet end 16 only when the parking brake pedal 8 is slightly pivoted clockwise by applying a further depression against the pedal pad 24 while maintaining its operated position.

Figure 7:
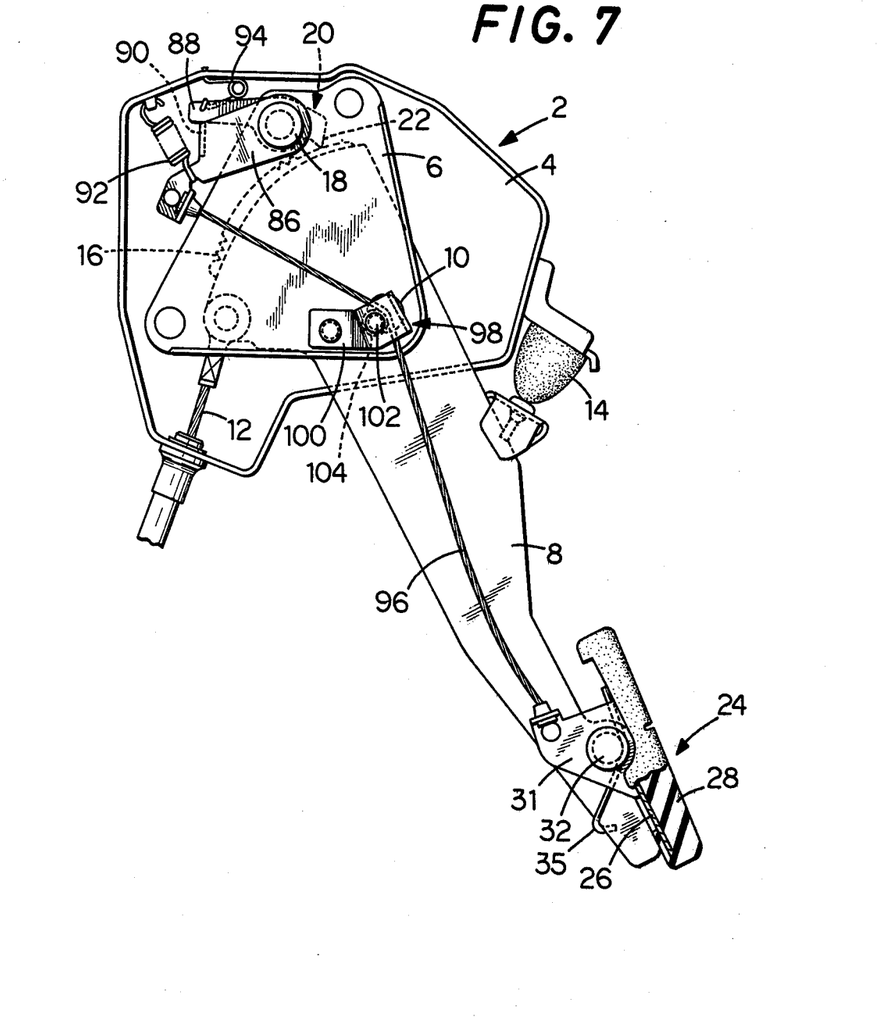
FIGS. 7 and 8 are side elevations of still another embodiment of the control device in its non-operated and operated positions, respectively.
Figure 8:
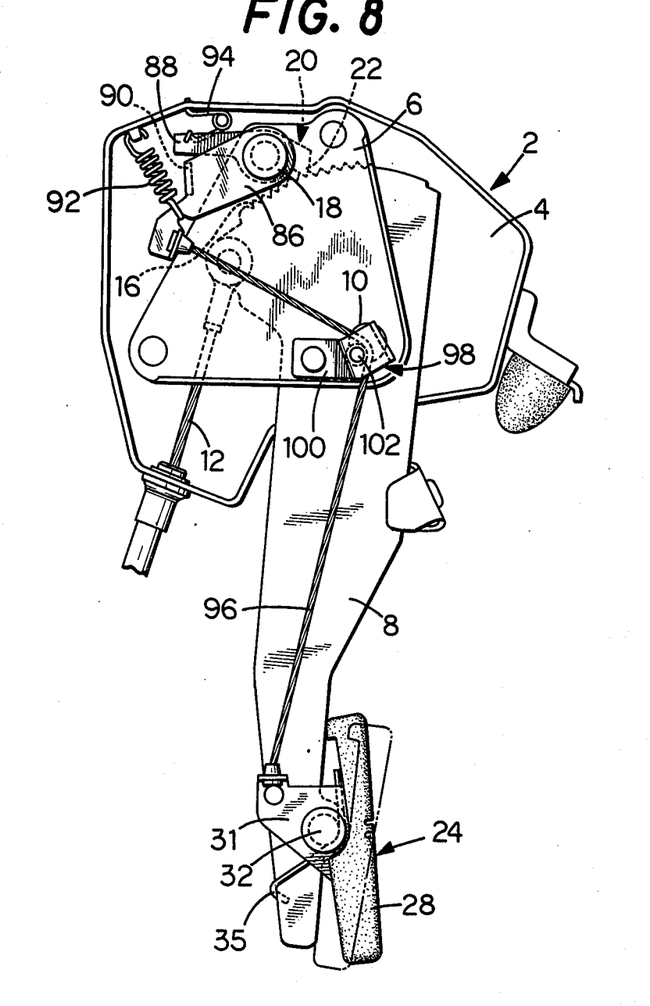

With reference to FIGS. 7 and 8, there is illustrated another form of the control device according to the invention, wherein the pedal pad 24 has a pair of rearwardly extending arms 31 similar to the arms 30 above described, and is pivotally connected to the pedal 8 with the pin 32 in the same manner as in the foregoing embodiments. However, the pedal pad 24 of this embodiment is different from the previous counterpart in that it is biased by a torsion spring 35 which is wound about the pin 32. One arm of the spring 35 is in engagement with the pedal 8 and the other arm with the pad 24 so that the spring 35 urges the pad 24 in the clockwise direction as viewed in FIG. 7. Thus, the pad 24 is held in its original position with its lower rear surface kept in abutment with the lower end portion of the pedal 8.

The pin 18 which pivotally supports the above described pawl member 20 with respect to the bracket 2, is also used to pivotally support a lever 86 which extends substantially in the same direction as an arm 88 of the pawl member 20 that is located opposite the pawl 22. The arm 88 has, at its middle part, a bent portion 90 corresponding to the bent portion 80 of FIGS. 5 and 6, and is biased clockwise as viewed in FIG. 7 by a coil spring 92 which is similar to the coil spring 82 in the previous embodiment with the exception that one end thereof is connected to a portion of the arm 86 near said middle part. With this construction, the bent portion 90 is kept in engagement with the lower side surface of the arm 88 whereby the pawl 22 of the pawl member 20 is held in engagement with the ratchet end 16. The pawl member 20 is also biased by a torsion spring 94 which is disposed in the same manner as the spring 84 described above. The coil spring 92 and the torsion spring 94 are each selected to have a resilient force as discussed above in connection with the corresponding springs 82 and 84.

The ends of the arms 31 of the pedal pad 24 and the free end of the lever 86 are connected to each other with a wire 96 which extends substantially along the length of the pedal 8 up to a wire guide 98 at the fulcrum of the pedal 8. The wire 96 is guided by the wire guide 98 and oriented to extend toward the connection with the free end of the lever 86. The wire guide 98 comprises a retainer 100 fixed to the second member 6 of the bracket 2, a shaft 102 supported between the second member 6 and the retainer 100, and a guide roll 104 rotatably fitted on the shaft 102 and having a circumferential surface which supports and guides the wire 96.

Referring now to FIG. 8, there will be described the manner of releasing the parking brake which is in the operated position. When the pad 24 is pivoted counterclockwise, by depressing the upper half thereof, to its operated position indicated in solid line, the arms 31 are pivoted in the same direction pulling the wire 96 and thereby causing the lever 86 to pivot in the counterclockwise direction. The counterclockwise rotation of the lever 86 results in the bent portion 90 moving away from the arm 88 of the pawl member 20. As a result, the urging force of the coil spring 92 which has been applied to the pawl member 20 so as to keep it in engagement with the ratchet end 16, is removed and the pawl member 20 is now urged by the torsion spring 94 in the counterclockwise direction. In this condition shown in FIG. 8, however, the pawl member 20 will not disengage from the ratchet end 16 as the resiliency of the torsion spring 94 is smaller than the force with which the engagement of the pawl member 20 with the ratchet end 16 is maintained. A further depression onto the upper half of the pad 24 and the resulting slight pivotal movement of the pedal 8 in the clockwise direction from the position of FIG. 8 will remove the engagement force between the pawl member 20 and the ratchet end 16 and allow the pawl member 20 to be pivoted counterclockwise and thus separated from the ratchet end 16.

Figure 9:
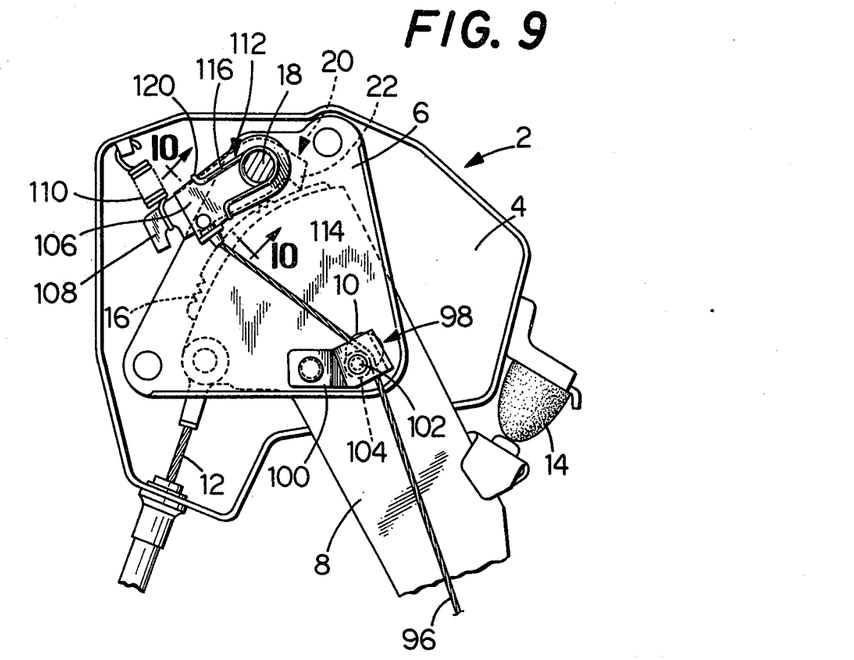
FIG. 9 is a side elevation of an essential part of an even further embodiment of the control device.
Figure 10:
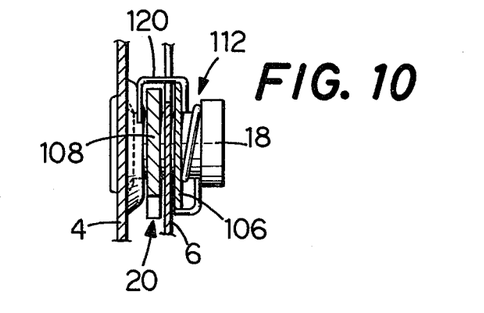
FIG. 10 is a cross section taken along line 10—10 of FIG. 9.
Figure 11:
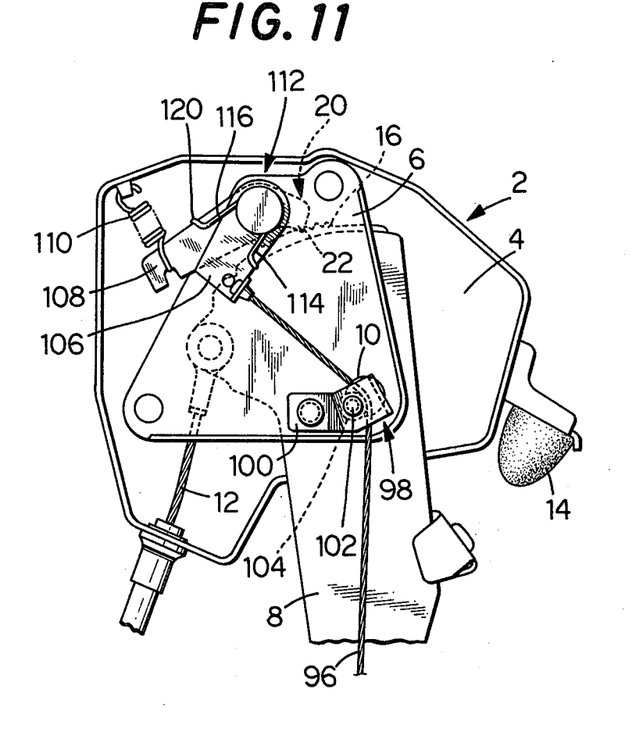
FIG. 11 is a side elevation of the control device of FIG. 9 when placed in its operated position.

FIGS. 9 through 11 demonstrate a further modified form of the control device of the invention wherein the pawl member 20 is biased by a coil spring 110 so that the pawl 22 is kept in engagement with the ratchet end 16. The pin 18 holds a torsion spring 112 for biasing the pawl member 20 for disengagement thereof from the ratchet end 16. The torsion spring 112 has two arms 114 and 116 extending along the length of a lever 106 which is pivotally supported by the pin 18. The arms 114 and 116 have ends engaging the opposite side edges of the lever 106 so as to pinch the lever 106 across its width. The end portion of the upper arm 116 is bent to form an operating portion 120 shown in FIG. 10, which portion 120 overlies the upper side of an arm 108. In other words, the lever 106 has a width slightly greater than that of the arm 108 so that the operating portion 120 held in engagement with the lever 106 is normally spaced from the upper side of the arm 108.

When the wire 96 connected to the lever 106 is pulled and the lever 106 is pivoted counterclockwise as shown in FIG. 11, the operating portion 120 of the upper arm 116 of the torsion spring 112 comes into abutment on the arm 108 of the pawl member 20. While the pawl member 20 is subject to the resilient forces of both coil and torsion springs 110 and 112 in this condition, the arrangement of the torsion spring 112 to have a greater resilient force than the coil spring 110 produces a balance force between the two springs with which the pawl member 20 is urged in the direction to separate the pawl member 20 from the ratchet end 16. Because the above balance force is selected to be smaller than an engagement force between the pawl member 20 and the ratchet end 16 as previously stated, the mere pivotal movement of the lever 106 by the wire 96 will not permit the pawl member 20 to disengage from the ratchet end 16. The disengagement of the pawl member 20 is attained only after the engagement force between the pawl member and the ratchet end is removed by a slight depression of the pedal 8.

While the present invention has been described in its preferred embodiments, it is to be understood that the invention is not limited thereto but may be otherwise embodied within the scope of the following claims.

What is claimed is:

1. A foot-operated device for controlling a parking brake of a vehicle, comprising:

a bracket;

a parking brake pedal connected to said bracket pivotally about a first axis and having at one end thereof ratchet teeth formed along an arc of a circle a center thereof being located at said first axis;

a pedal pad connected to the other end of said parking brake pedal pivotally about a second axis parallel to said first axis, said pedal pad being pivoted between its original position and operated position;

a pawl member connected to and spaced from said bracket pivotally about a third axis parallel to said first axis, said pawl member including a pawl engageable with said ratchet teeth;

a lever connected to said bracket pivotally in proximity of said pawl member about a fourth axis aparllel to said first axis;

connecting means for linking said pedal pad to said lever to transmit a pivotal movement of the former to the latter such that a movement of said pedal pad incident to a pivotal movement of said parking brake pedal is not transferred to said lever; and spring means, associated with said pawl member and said lever, for biasing said pawl member in a first direction that causes said pawl to engage said ratchet teeth while said pedal is placed in said original position, and biasing said pawl member in a second direction that causes said pawl to disengage from said ratchet teeth while said pedal pad is placed in said operated position, the direction of biasing said pawl member by said spring means being changed from said first direction to said second direction by a pivotal movement of said lever resulting from the pivotal movement of said pedal pad from said original position to said operated position, a biasing force of said spring means in said second direction being smaller than an engagement force existing between said pawl member and said ratchet teeth in engagement with said pawl member.

2. A device as recited in claim 1, wherein said lever including an engagement arm and said connecting means including another lever having an axially middle portion which is connected to an axially middle portion of said parking brake pedal pivotally about a fifth axis parallel to said first axis, said another lever having one end engaging said pedal pad and the other end engaging said engagement arm of said lever in the proximity of said first axis.

3. A device as recited in claim 1, wherein said connecting means includes a wire connecting said pedal pad and said lever, and a wire guide located in the proximity of said first axis to guide said wire.

4. A foot-operated device for controlling a parking brake of a vehicle, comprising:

a bracket fixed to a frame of the vehicle;

a parking brake pedal connected to said bracket pivotally about a first axis and having at one end thereof ratchet teeth formed along an arc of a circle having a center located at said first axis;

a pedal pad connected to the other end of said parking brake pedal pivotally about a second axis parallel to said first axis, said pedal pad being pivoted between its original position and operated position;

a first lever having an axially middle portion connected to an axially middle portion of said parking brake pedal pivotally about a third axis parallel to said first axis, and one end engaging said pedal pad, said first lever being pivoted in one direction when said pedal pad is pivoted in the opposite direction from said original position to said operated position;

a second lever connected to said bracket pivotally about a fourth axis parallel to said first axis, and having a first arm portion engaging the other end of said first lever in the proximity of said first axis, said second lever being pivoted in the opposite direction when said first lever is pivoted in said one direction;

a pawl member connected to said bracket pivotally about a fifth axis parallel to said first axis, and having a pawl engageable with said ratchet teeth of said parking brake pedal; and spring means, associated with said second lever and said pawl member, for biasing said pawl member in a first direction that causes said pawl to engage said ratchet teeth while said pedal pad is placed in said original position, and biasing said pawl member in a second direction that causes said pawl to disengage from said ratchet teeth while said pedal pad is placed in said operated position, the direction of biasing said pawl member by said spring means being changed from said first direction to said second direction by a pivotal movement of said second lever resulting from a pivotal movement of said pedal pad from said original position to said operated position, a biasing force of said spring means in said second direction being smaller than an engagement force existing between said pawl member and said ratchet teeth in engagement with said pawl member.

5. A device as recited in claim 4, wherein said spring means comprises a first spring having one end connected to said bracket and the other end of said spring connected to said pawl member to bias said pawl member in said first direction while said pedal pad is in said original position, and a second spring which is a torsion spring having both ends secured to said second lever, one of said both ends engaging said pawl member to bias said member in said second direction while said pedal pad is in said operated position, a resilient force of said second spring being greater than that of said first spring by an amount less than said engagement force.

6. A device as recited in claim 5, wherein said pawl member includes an arm extending in a direction substantially opposite to a direction in which said pawl extends, and said second lever includes a second arm portion extending substantially in parallel to said arm of the pawl member, said other end of said first spring being connected to a free end of said arm of the pawl member, said second spring being wound about said fourth axis, one of said both ends of the second spring engaging said first arm portion and the other end being bent to engage said second arm portion, said other end of the second spring overlying said arm of the pawl member while said pedal pad is in said original position and engageable with said arm when said pivotal movement of said second lever takes place.

7. A device as recited in claim 4, wherein said pawl member includes an arm extending in a direction substantially opposite to a direction in which said pawl extends, and said second lever includes a second arm portion extending substantially in parallel to said arm of the pawl member, said spring means comprising a spring having one end connected to a free end of said arm of the pawl member and the other end of said spring connected to a free end of said second arm portion, said other end of the spring being located on one side of a straight line passing said one end of the spring and said fourth axis while said pedal pad is in said original position, and on the other side of said straight line while said pedal pad is in said operated position.

8. A device as recited in claim 4, wherein said other end of said first lever has a pin engaging said first arm portion of said second lever, said pin being concentric with said first axis while said pedal pad is in said original position.

9. A device as recited in claim 4, wherein said other end of said first lever is connected to said first arm portion of said second lever through engagement of a pin with an elongated hole, said pin being concentric with said first axis while said pedal pad is in said original position.

10. A device as recited in claim 4, wherein said pawl member includes an arm extending in a direction substantially opposite to a direction in which said pawl extends, and said second lever includes a second arm portion extending substantially in parallel to said arm of the pawl member, said spring means comprising a first spring biasing said second lever in said first direction and a second spring biasing said pawl member in said second direction, a resilient force of said first spring being greater than that of said second spring which is smaller than said engagement force, said second arm portion having a projection engaging said arm of the pawl member to transmit the resilient force of said first spring to said pawl member while said pedal pad is in said original position, said projection disengaging from said arm when said pivotal movement of said second lever takes place.

11. A device as recited in claim 10, wherein said first spring comprises a coil spring having one end connected to said bracket and the other end connected to a free end of said second arm portion to bias said pawl member through said projection, and said second spring comprises a torsion spring having one end engaging said bracket and the other end engaging said arm of the pawl member.

12. A foot-operated device for controlling a parking brake of a vehicle, comprising:

a bracket fixed to a frame of the vehicle;
a parking brake pedal connected to said bracket pivotally about a first axis and having at one end thereof ratchet teeth formed along an arc of a circle having a center located at said first axis;
a pedal pad connected to the other end of said parking brake pedal pivotally about a second axis parallel to said first axis, said pedal pad being pivoted between its original position and operated position;
a pawl member connected to said bracket pivotally about a third axis parallel to said first axis, said pawl member including a pawl engageable with said ratchet teeth;
a lever connected to said bracket pivotally in proximity of said pawl member about a fourth axis parallel to said third axis;
an extension arm extending from a rear surface of said pedal pad;
a wire connecting said extension arm and said lever such that said lever is in its original position when said pedal pad is in said original position and such that said lever is pivoted to its operated position when said pedal pad is pivoted to said operated position;
a wire guide supporting and guiding a substantially middle portion of said wire at the position of said first axis;
a first spring biasing said pawl member in a first direction that causes said pawl to engage said ratchet teeth while said lever is in the original position; and
a second spring biasing said pawl member in a second direction that causes said pawl to disengage from said ratchet teeth while said lever is in the operated position, a resilient force of said second spring being smaller than an engagement force existing between said pawl member and said ratchet teeth in engagement with said pawl member.

13. A device as recited in claim 12, wherein said pawl member includes an arm extending in a direction substantially opposite to a direction in which said pawl extends, and said lever having a projection engageable with said arm of the pawl member, a resilient force of said first spring being greater than said resilient force of said second spring whereby said first spring biases said pawl member in said first direction through said projection while said lever is in the original position.

14. A device as recited in claim 13, wherein said first spring comprises a coil spring having one end connected to said bracket and the other end of said coil spring connected to said lever, and said second spring comprises a torsion spring having one end engaging said bracket and the other end of said torsion spring engaging said arm of the pawl member.

* * * * *